S. P. SMURR.
MACHINE FOR COILING WIRE.
APPLICATION FILED APR. 24, 1912.

1,382,251.

Patented June 21, 1921.
8 SHEETS—SHEET 1.

Witnesses
Robert H. Weir
W. E. Smith

Inventor
Samuel P. Smurr
By Ino. E. Waldo
Atty.

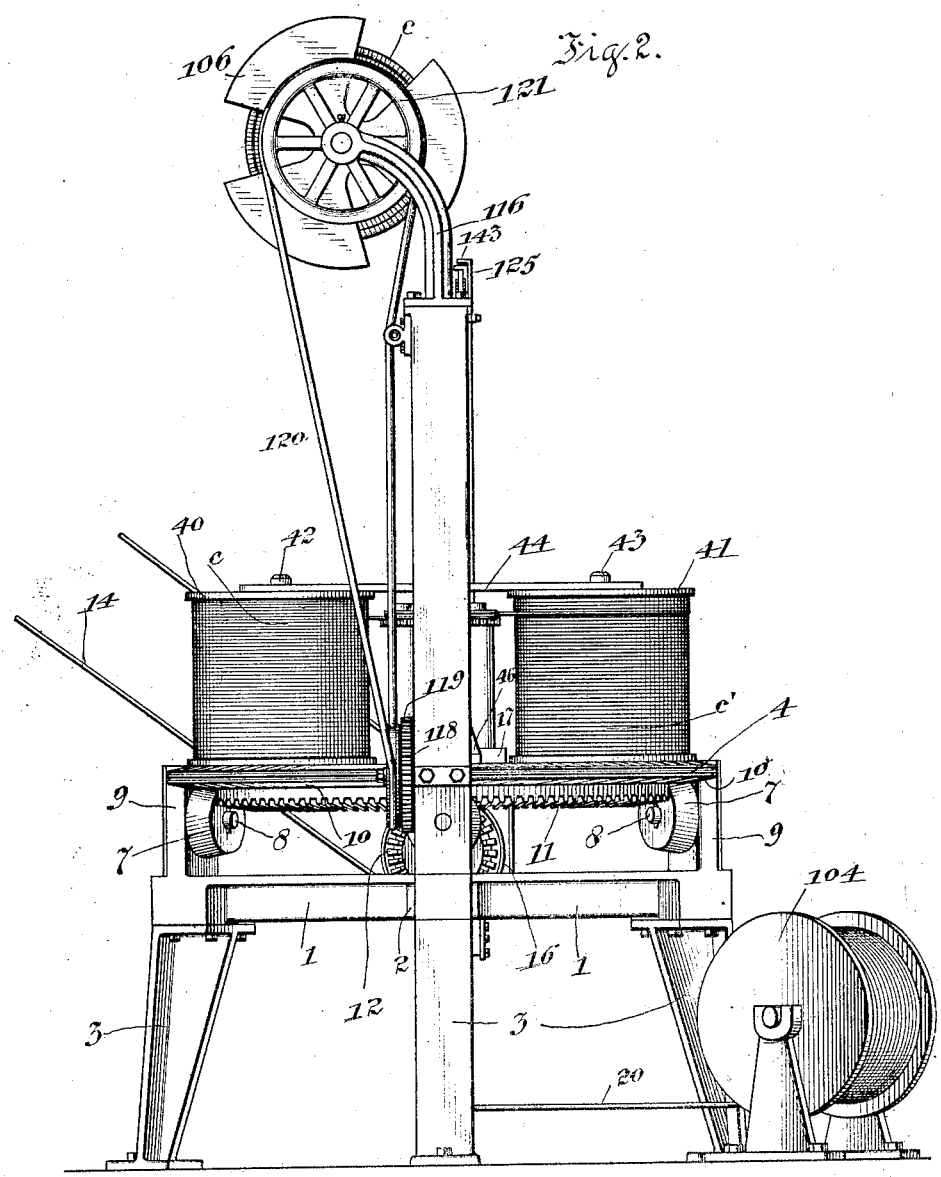

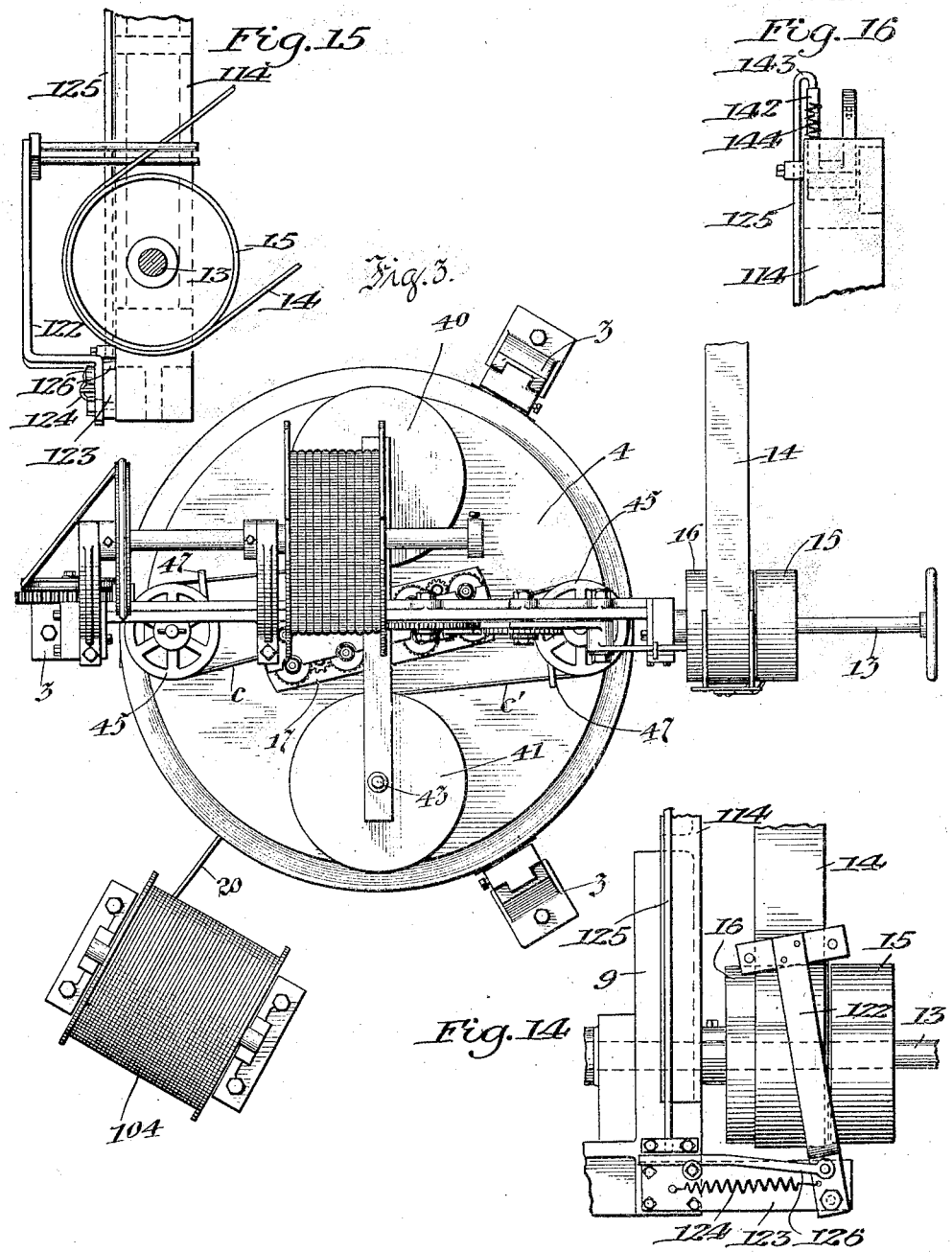

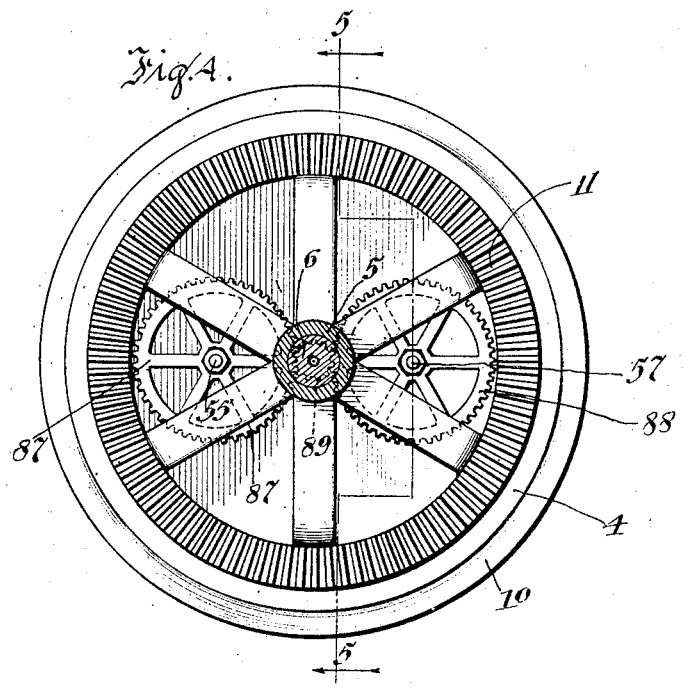
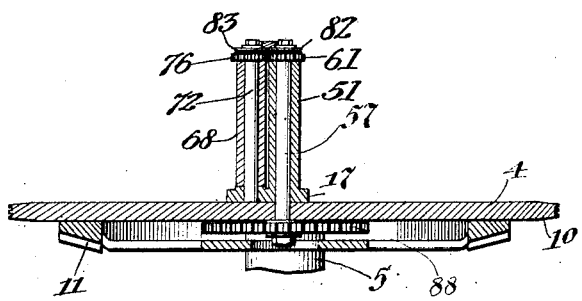

S. P. SMURR.
MACHINE FOR COILING WIRE.
APPLICATION FILED APR. 24, 1912.

1,382,251.

Patented June 21, 1921.

Witnesses
Robert F. Weir
W. E. Smith

Inventor
Samuel P. Smurr
By Jno. E. Waldo
Atty.

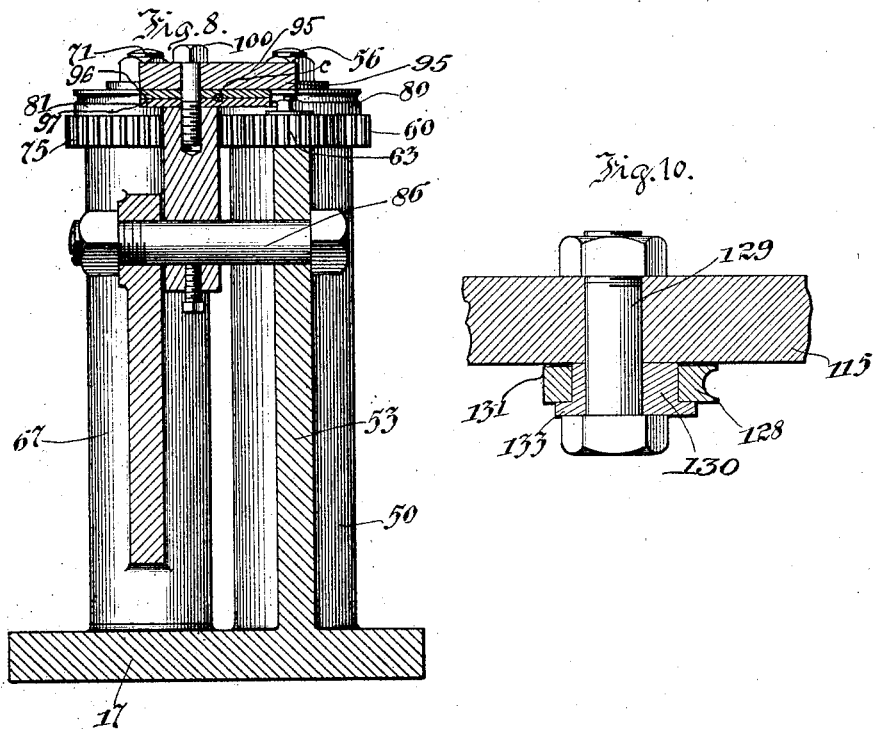
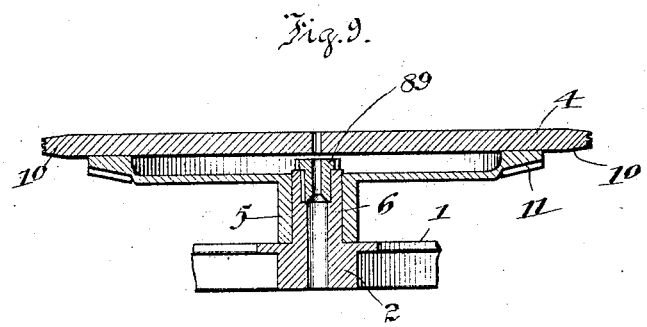

S. P. SMURR.
MACHINE FOR COILING WIRE.
APPLICATION FILED APR. 24, 1912.

1,382,251.

Patented June 21, 1921.
8 SHEETS—SHEET 7.

Witnesses
Robert H. Weir
W. F. Smith

Inventor
Samuel P. Smurr,
By Geo. E. Waldo,
Atty.

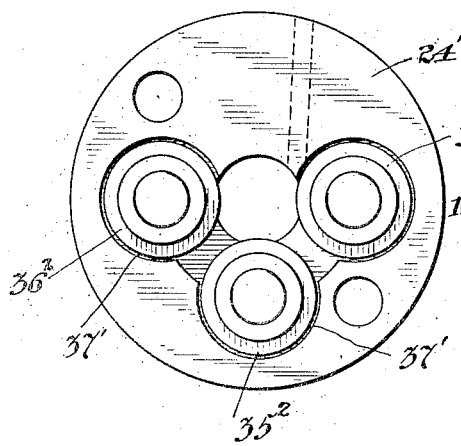
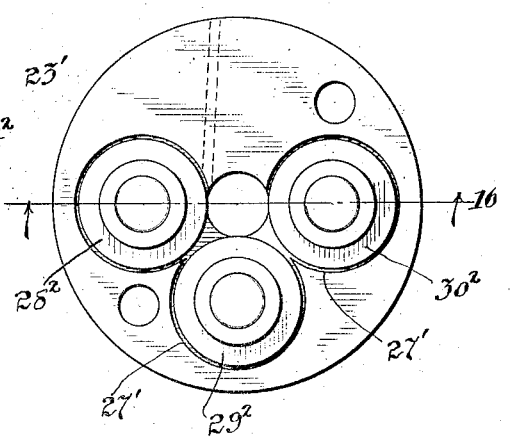
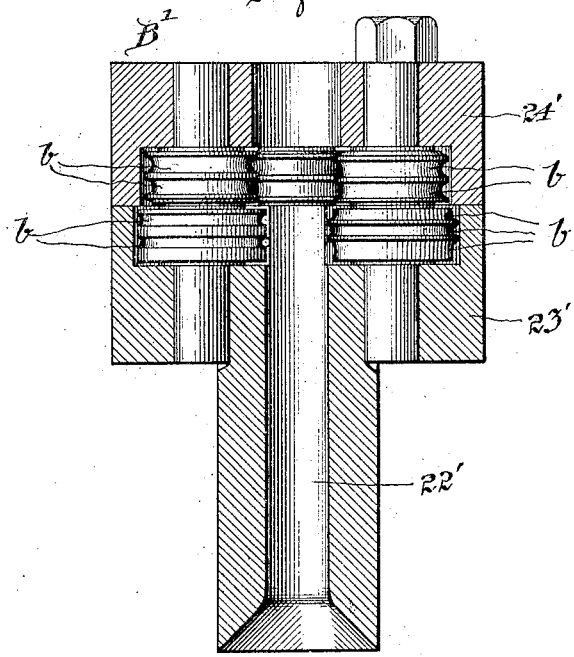

UNITED STATES PATENT OFFICE.

SAMUEL P. SMURR, OF CHICAGO, ILLINOIS, ASSIGNOR, BY MESNE ASSIGNMENTS, TO VERONA V. WALDO.

MACHINE FOR COILING WIRE.

1,382,251. Specification of Letters Patent. Patented June 21, 1921.

Application filed April 24, 1912. Serial No. 692,974.

*To all whom it may concern:*

Be it known that I, SAMUEL P. SMURR, a citizen of the United States, and a resident of Chicago, in the county of Cook and State of Illinois, have invented a certain new and useful Improvement in Machines for Coiling Wire, of which the following is a specification.

This invention relates to machines for coiling wire and relates particularly to such machines for making and applying flexible wire tubing to insulated electrical conductors, to form the product generally known to the trade as "armored electrical cables".

The object of the invention is to provide an improved wire coiling machine of simplified construction and increased efficiency, both as regards the character of the work and the capacity of the machine.

To this end, a machine of my invention comprises the various features, combinations of features and details of construction hereinafter described and claimed.

In the accompanying drawings, in which my invention is fully illustrated,—

Figures 1 and 2 are side views of my improved wire coiling machine taken at ninety degrees from each other;

Fig. 3 is a top plan view thereof;

Fig. 4 is a bottom plan view of the rotatable bed of my improved machine and of the bevel gear for rotating the same and of certain parts coöperating therewith, showing the means for supporting said bed in cross-section on the line 4—4 of Fig. 1;

Fig. 5 is a sectional view on the line 5—5 of Fig. 4;

Fig. 8 is a sectional view on the line 8—8 of Fig. 7;

Fig. 9 is a fragmentary detail sectional view on the line 9—9 of Fig. 1.

Fig. 10 is a fragmentary detail sectional view on the line 10—10 of Fig. 1;

Figure 1:
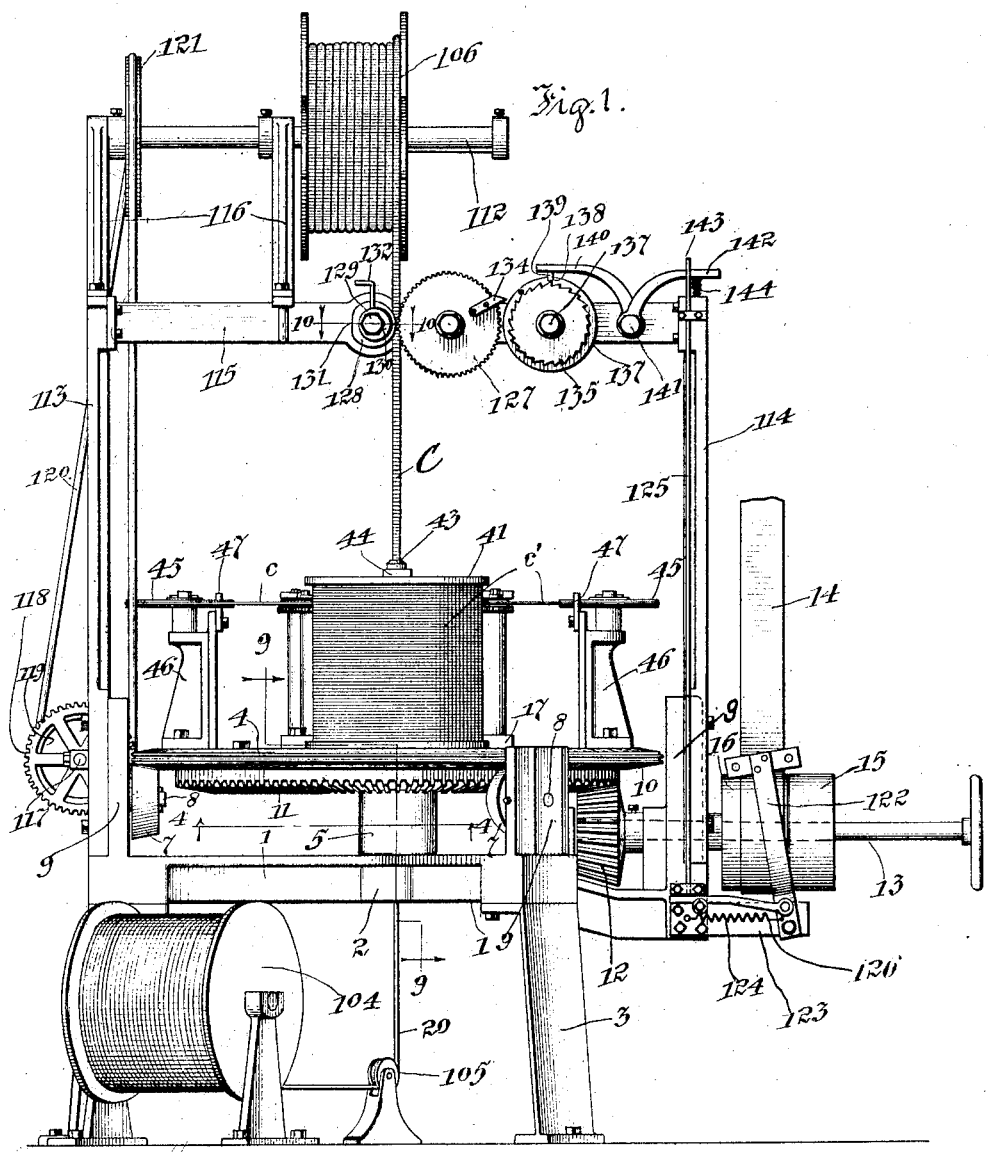
Figure 6:
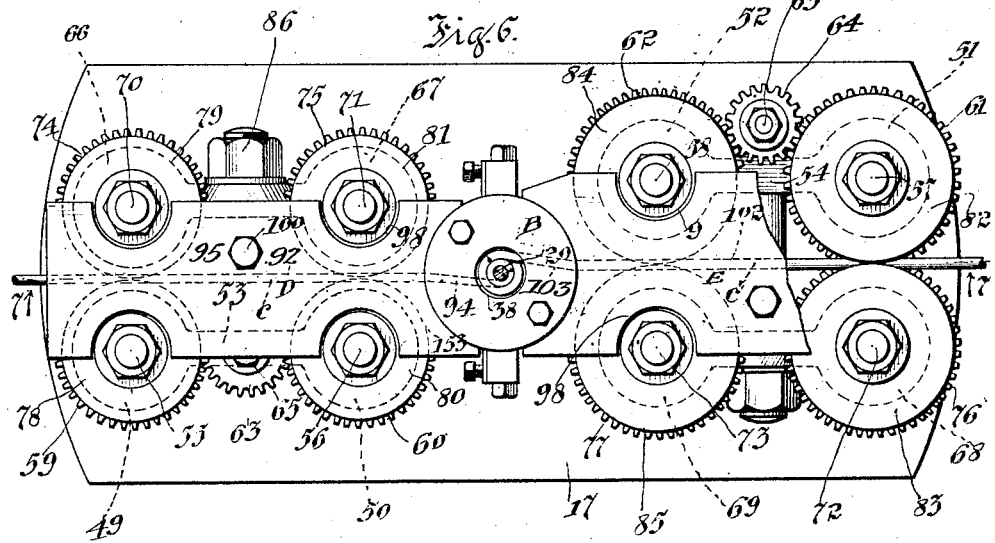
Fig. 6 is a top plan view on an enlarged scale of the wire feeding mechanism and of the coiling head.
Figure 7:
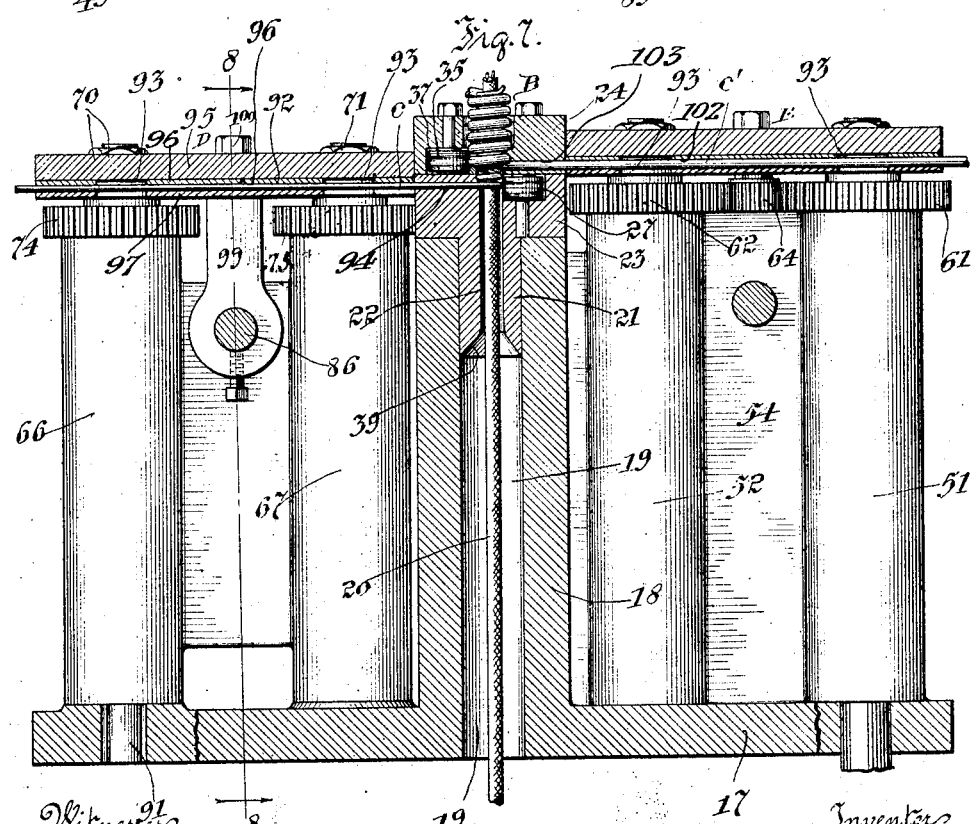
Fig. 7 is a substantially central sectional view thereof on the line 7—7 of Fig. 6.
Figure 11:
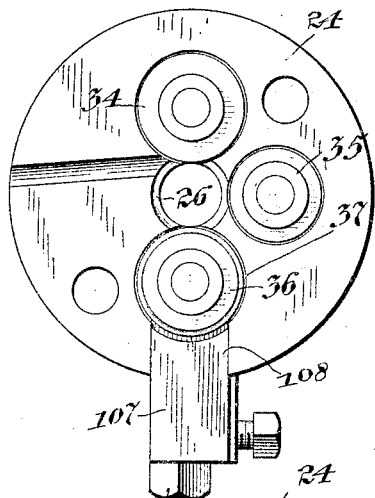
Figs. 11 and 12 are enlarged bottom and top plan views of the upper and lower sections, respectively, of the coiling head.
Figure 12:
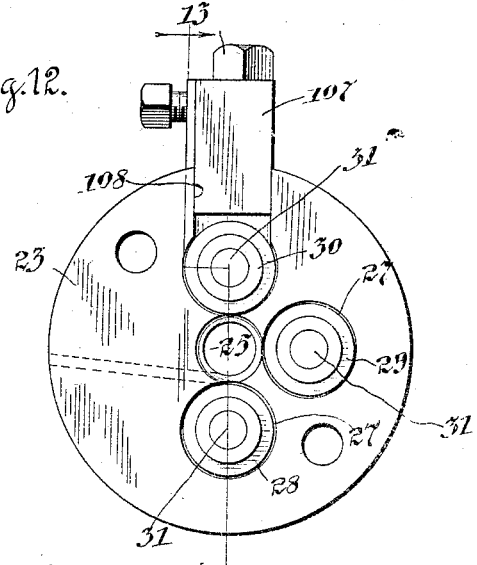
Figure 13:
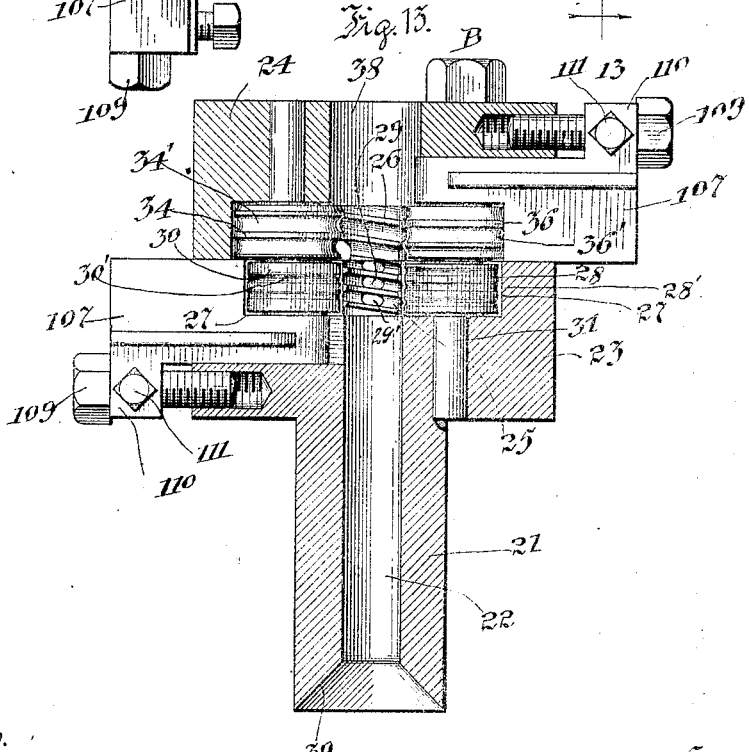
Fig. 13 is a sectional view of the coiling head, the line of section being indicated on Fig. 12 by the line 13—13.

Figs. 14, 15 and 16 are enlarged fragmentary views illustrating the automatic belt shifting mechanism; and Figs. 17, 18 and 19 are views substantially similar to Figs. 11, 12 and 13, respectively, illustrating a modified form of coiling head.

For purposes of concrete illustration, I have shown my invention embodied in a machine for making armored electrical cables.

The frame proper of my improved machine comprises members 1 which diverge from a central bearing hub 2 in substantially radial directions and at uniform angles from each other, the outer ends of which are supported on suitable legs 3.

Rotatably mounted on the frame proper is a bed 4, the bearing for which is formed in a boss 5 on the lower side thereof, which is fitted so as to rotate freely on a stud or boss 6 secured in or formed on the central hub 2 of the main frame, said stud or boss being provided with a hole extending entirely through the same.

The weight of the rotatable bed 4 is carried by means of anti-friction rollers 7, rotatably mounted on studs 8 secured in upright projections or standards 9 on the main frame of the machine. As shown, the rollers 7 are tapered and run in contact with a correspondingly tapered tread 10 formed at the outer edge of the under side of said rotatable bed.

Rotation is adapted to be imparted to said bed 4 by means of bevel gears 11 and 12, of which the bevel gear 11 is firmly secured to the under side of the bed 4, so as to rotate therewith, and the bevel gear 12 is secured to rotate with a shaft 13, which is adapted to be driven from any suitable source of power, not shown, by means of a belt 14, adapted to run upon tight and loose pulleys 15 and 16 on said shaft 13.

All of the wire coiling mechanism is mounted on the rotatable bed 4, so as to rotate therewith, the construction and method of operation thereof being as follows: Secured to the upper surface of the bed 4 is a plate 17, formed on which is a central pedestal 18, provided with an axial hole or opening 19, through which the mandrel about which the flexible tube is to be formed, in the present case the electrical cable 20, extends, and secured in the upper end of which, so as to rotate therewith, is the coiling head, designated as a whole B, said coiling head B being provided with an axial shank 21 fitted to and secured in the bore 19 formed through said pedestal 18.

Formed vertically through the head B and the shank 21 thereof is a hole or opening 22, through which the electric cable 20 extends. Said head B is made in two sections, comprising a lower section 23 and an upper section 24 rigidly secured thereto by means of cap screws or the like.

At the extreme upper end of the bore 22, through the lower section 23 of the head B, is formed a spiral groove 25, the pitch of said groove being the same as the pitch on which the inner wire c is wound around the electric cable 20.

At the lower end of the upper section 24 of the head B, the opening 22 is somewhat enlarged, and formed therein is a spiral groove 26, the pitch and lead of which is equal to the pitch and lead of the spiral on which the outer wire c' is to be wound, and the diameter of which is equal to the outside diameter of the coil formed by said outer wire c' and of the finished tube. The pitch of the coil on which the inner and outer wires c, c' are wound is the same, and said spiral grooves 25 and 26 are so positioned that the groove 26 will split the pitch of the groove 25, thus bringing the spirals of the outer wire c' exactly between the spirals of the inner wire c.

In the preferable construction shown each of the grooves 25 and 26 forms approximately a single spiral only, as I have discovered that all of the bend of the wire can be effected in the formation of the first coil.

Heretofore, in all wire coiling machines of which I have any knowledge, it has been necessary in starting the machine, to form the first coils by hand and to insert them into the machine in such bent condition before the machine is started, this operation having to be repeated each time a new length or piece of wire is to be started into the machine. This operation was very inconvenient, and necessarily involved delay and incidentally expense, and was for that reason very objectionable.

A particular advantage of my machine is that I have devised a construction whereby I am enabled to start the wire in the machine without first bending the end thereof, by merely inserting the same into a guide formed through the side of the head B into said grooves 25 and 26, as presently described.

This end is accomplished in the following manner:—Formed in the upper end of the lower section 23 of the head B, concentric with the bore 22 formed through said head, are recesses 27, all of which open into the bottom of the groove 25, and rotatably mounted in said recesses 27 are anti-friction rollers 28, 29 and 30, the faces of which project inwardly slightly beyond the bottom of said groove 25, so that as the wire c passes around said groove, it will bear upon said anti-friction rollers, which will serve to force said wires inwardly away from the sides of said groove, thus greatly reducing the friction due to the formation of the initial bend or spiral as the straight wire enters said groove 25.

As shown, the rollers 28, 29 and 30 are located substantially at angles of ninety degrees from each other, the first roller 28 being located in such position that the wire will contact with the same as it enters said groove 25. Said roller 28 is likewise so positioned and made of such length that the second coil of the spiral will also bear against said roller.

As shown, the anti-friction rollers 28, 29 and 30 are mounted on studs 31 secured in the bottoms of the recesses 27, said anti-friction rollers 28, 29 and 30 being confined between the bottoms of said recesses 27 and the under surface of the upper section 24 of the head B, between which said rollers are fitted so as to rotate freely.

The upper section 24 of said head B is, in like manner, provided with anti-friction rollers 34, 35 and 36, rotatably mounted in recesses 37 formed in the under side of said section 24, in substantially the same manner as the anti-friction rollers 28, 29 and 30 are mounted in the lower section 23, and the positions of said anti-friction rollers 34, 35 and 36 being such that said anti-friction rollers will project inwardly for a short distance beyond the bottom of said groove 26, whereby they will operate to force the wire c' away from the sides of said groove 26, in the same manner as the anti-friction rollers 28, 29 and 30 force the wire c inwardly away from the sides of the groove 25, and in the same manner reducing the frictional engagement between said wire c' and the sides of the groove as said wire c' is forced into said groove through its guide in the head B, as presently described.

Said anti-friction rollers 34, 35 and 36 are likewise spaced apart at angles of substantially ninety degrees, the first roller 34 being so positioned that the wire c' will contact with the same as it enters said groove 26.

To prevent wearing of the coiling groove 26 in the upper section 24 of the coiling head B under the tension of the reeling device on which the finished product is wound, as presently described, the anti-friction rollers in the upper head section 24 preferably comprise grooved rollers, said grooved rollers including the last roller 36, and said grooves registering with and forming, in effect, sections of the spiral guide groove 26. As shown, both the first roller 34 and the last roller 36 are thus grooved, the grooves in said rollers being designated 34' and 36', respectively. With the construction described, the wear on said grooves caused by the side pull due to the tension of the reeling device on the finished product, will be distributed, due to the rotation of said rollers, and, in any event, will be very slight, as, in practice, said anti-friction rollers will be hardened.

Preferably, also, the anti-friction rollers in the lower head section 23 and any in the upper head not grooved as above described, as shown the intermediate roller 35, are grooved very slightly to prevent flattening of the outer sides of the wires $c$, $c'$, which come into direct contact with said anti-friction rollers. The manner of grooving said rolls is clearly indicated in Fig. 13 of the drawings in which 28' and 30' designate the grooves in the rolls 28 and 30, respectively, and the rolls 29 and 35 are grooved in the same manner. In practice, suitable grooves for the purpose may be formed by operating the machine to coil wire, as in actual use, before said anti-friction rollers are hardened. In this manner, grooves are soon worn in said rollers, any burs formed at the edges of said grooves are removed, said rollers hardened and replaced in the head B. The machine is then ready for regular operation.

Above the groove 26 the axial opening in said head is enlarged, as shown at 38, to a size slightly larger than the outside diameter of the finished tube or cable C, so as to permit said cable to pass through the same after leaving the bending dies or grooves.

To facilitate inserting the electric cable 20 upwardly through the bore 19 of the pedestal 18, and the bore 22 in the head B, the lower end of the hole 22 is inwardly and upwardly beveled, as shown at 39.

The wires $c$, $c'$ are delivered to the head or die B from coils 40 and 41, rotatably mounted on upright spindles 42 and 43, secured in the rotatable bed 4, the upper ends of said spindles 42 and 43 being connected by a bar 44, which is provided with a central opening in vertical alinement with the hole 22 through the head B for the passage of the finished cable C. The weight of the coils 40, 41 provides a friction between said coils and the surface of the bed 4 which will hold said coils against rotation excepting as the wires $c$, $c'$ are unreeled therefrom in the operation of the machine.

From the coils 40, 41, the wires $c$, $c'$ pass around grooved guide sheaves 45 rotatably mounted at the upper ends of brackets or standards 46, secured in fixed upright position to the upper surface of the bed 4, said wires being guided into the grooves of said guide sheaves from said coils 40, 41 by means of fixed eyes 47 on the standards 46.

The means for feeding said wires $c$, $c'$ from the guide sheaves 45 into the head B are as follows: Formed on the base plate 17 on the bed 4 are fixed pedestals 49, 50 and 51, 52, said pedestals being symmetrically located at opposite sides of the central pedestal 18 which carries the coiling head B.

The pedestals 49 and 50 are connected by a web 53, and the pedestals 51 and 52 by a web 54. Rotatably mounted in bearings formed vertically in the pedestals 49, 50, 51, and 52 are shafts 55, 56, 57, and 58, secured to the projecting upper ends of which are gear wheels 59, 60, and 61, 62, which are connected in train, respectively, by intermediate idle gears 63 and 64 mounted so as to rotate freely on studs 65 secured in the upper ends of the webs 53 and 54, respectively.

Supported in upright position on the base plate 17 in transverse alinement with said pedestals 49, 50, 51, and 52, are bearing sleeves 66, 67, 68, and 69, rotatably mounted in which are upright shafts 70, 71, and 72, 73, secured to the projecting upper ends of which, respectively, so as to rotate therewith, are gear wheels 74, 75, and 76, 77, which mesh respectively with the gears 59, 60, 61, and 62, and secured to rotate with opposed shafts and gears are feed rollers 78, 79; 80, 81; 82, 83; and 84, 85; formed in which are grooves adapted to receive the wires $c$, $c'$ from the guide sheaves 45.

Rotation is adapted to be imparted to the various feed rollers by means of gears 87 and 88, secured to the lower ends of the shafts 55 and 57, respectively, which project below the bed 4, and which mesh with a pinion 89 secured against rotation to the upper end of the stud 6 which forms the bearing for the table 4.

The bearing sleeves 66, 67, and the bearing sleeves 68 and 69 are adjustably supported relatively to the fixed pedestals 49, 50, 51, and 52, by means of bolts 86, which extend through the webs 53 and 54, which connect the pedestals 49 and 50, and 51 and 52, respectively, and corresponding webs which connect the bearing sleeves 66 and 67, and 68 and 69, respectively.

At their lower ends, the bearing sleeves 66, 67, 68 and 69 are fulcrumed to the base plate 17 so that the tightening of the nuts on the bolts 86 will operate to force the adjustable feed devices toward the fixed feed devices. As shown, said bearing sleeves are fulcrumed by means of pins 91, which engage corresponding holes or openings formed in the base plate 17. Tightening the nuts on the bolts 86 will thus operate to force the feed rollers supported at the upper ends of said adjustable bearing sleeves toward their coacting feed rollers, and will cause said feed rollers to firmly grip the wires $c$, $c'$.

Buckling of the wires $c$, $c'$ under the action of the feed devices, and as they are forced into the bending grooves or dies 25 and 26 in the head B, is prevented by means of suitable guides.

As shown, the guide for the wire c consists of a hole or opening 92 formed lengthwise in a plate designated, as a whole D, said plate being recessed, as shown at 93, on its under side to receive the opposed feed rollers 78, 79, 80, and 81, said recesses cutting into each other to permit said feed rollers to engage said wires c.

The inner end of the plate D closely embraces the side of the head B, and formed in the head B, with its outer end in register with the hole 92 in said plate D and its inner end opening into the lower end of the spiral groove 25, is a hole or opening 94.

The holes 92 and 94 in the plate D and head B being substantially of the same cross section as the wire c, will operate in an obvious manner to prevent buckling of the same, in the manner stated.

For convenience of manufacture, the guide plate D preferably comprises three separate plates, to wit, an upper plate 95, which forms the base or support of said guide and plates 96 and 97, rigidly secured to the under side of said base plate 95.

For convenience in forming the hole or opening 92, for the wire c, the plates 96 and 97 are initially made integral with each other. A groove equal to the width of the hole or opening 92, and of a depth equal to one-half of said width is formed lengthwise therein. Said plate or bar is then divided transversely to form the separate plates 96 and 97, which are then placed one above the other in position so that the grooves therein will register with each other and form the hole or opening 92, and in this position are secured to the under side of the base plate 95. The recesses 93 in the plates 96 and 97, which receive the feed rollers, are then formed by means of a suitable tool, and the base plate 95 is notched or recessed at its edges as shown at 98, to receive hubs formed on the upper sides of the feed rollers 78, 79, 80, and 81.

The weight of the guide plate D is carried by a bracket 99, supported on the bolt 86, said guide plate D being connected to said bracket by means of a cap screw 100 or the like, which extends through a suitable hole formed into said guide plate, and is threaded into the upper end of the bracket 99. The bracket 99 is provided with a head on its lower end, formed in which is a hole or opening adapted to receive the bolt 86.

During the operation of the machine, the drag or friction of the wire c in the hole or opening 92, will tend to maintain the inner end of said guide plate D closely in contact with the head B.

In like manner, buckling of the wire c' is prevented by confining said wire in guide grooves 102, 103, formed lengthwise in a guide plate E and in the head B, the outer end of said groove 103 registering with the inner end of the groove 102, and its opposite end with the lower end of the spiral groove 26 in said head B.

The construction of the guide plate E and the manner of supporting same is substantially identical with the construction of the guide plate D, and will be readily understood without a detailed description thereof.

The electric cable 20 is wound upon a reel 104 mounted on the floor at one side of the machine, whence it passes around a guide sheave 105 upwardly through the hollow journal of the bed 4, the hollow pedestal 19 and the opening 22 in the head B, and as the flexible tube is formed around same, is wound upon a corresponding reel 106 mounted on the machine frame above the head or die B and coöperating parts, as will presently be described.

The feed devices are so proportioned that, at each revolution of the bed 4, proper lengths of the wires c, c' will be fed into the head B to form one spiral of the grooves 25 and 26, respectively. With this relation, it is obvious that no twisting of the cable 20 or of the finished product will be produced, and that said finished product may be wound upon the receiving reel 106 without kinking.

I have found in practice, however, that as produced commercially, wire of the same gage is liable to vary a slight fraction of an inch in diameter, which will result in gradually twisting the finished product C in one direction or the other, causing it to kink in handling. To overcome this objectionable feature, each set of anti-friction rollers 28, 29 and 30 and 34, 35 and 36, comprises one or more rollers supported in such manner that it will be adjustable toward and from the axis of the head B. As shown, the last rollers 30 and 36 of each set, respectively, are thus adjustable, the means for adjusting said rollers comprising blocks 107 slidably fitted to grooves 108 formed in said head B, on the inner ends of which, respectively, the rollers 30 and 36 are mounted. Said blocks 107 are adapted to be adjusted by means of screws 109 which extend through holes formed in lugs 110 on said blocks and which are secured in screw threaded engagement with suitable holes on the head B. The adjusting screws 109 are adapted to be locked in position corresponding to the desired adjustment of the blocks 107 by means of set screws 111 in an obvious manner.

As shown, the reel 106 is secured to rotate with a shaft 112, rotatably mounted in suitable bearings formed in an overhead frame, comprising upright members 113, 114, the member 113 being secured to the post 9 at one side of the machine, and the member 114 to the corresponding post 9 at the opposite side of the machine, said overhead frame also comprising a transverse member 115 which connects said upright members 113, 114 adjacent to their upper ends. The bearings for the shaft 112 are formed directly in arms 116 secured to and which project upwardly from the upper end of the upright member 113, and the transverse member 115, respectively.

Rotation is adapted to be imparted to the reel 106 to wind the finished cable C upon the same by means of a suitable driving connection with the bed 4. As shown, said driving connection is as follows:—Rotatably mounted on a stud 117, secured in the upright frame 113, are a worm gear 118 and a pulley 119, said worm gear and pulley being connected so as to rotate together. The worm gear 118 meshes with a worm formed directly in the perimeter of the bed 4, whereby the rotation of said bed 4 will impart slow rotation to the worm gear 118 and the pulley 119 secured thereto. The shaft 112 is driven from the pulley 119 by means of a belt 120 adjusted to said pulley 119 and to a pulley 121 secured to rotate with said shaft. As shown, the belt 120 is a round belt, the pulleys 119 and 121 being correspondingly grooved to receive same.

The relative sizes of the pulleys 119 and 121 is such that the peripheral speed of the drum 106 will be greater than the rate at which the finished cable C is delivered from the machine. Said reel will thus operate to maintain the cable C taut, slippage of the belt 120 permitting the reel 106 to accommodate itself to the rate of movement of the finished cable C, as it comes from the machine.

To comply with a requirement of the insurance underwriters that the finished cable C shall be marked on every fifty foot length with an inspection tag, my machine also preferably comprises means for automatically stopping the machine at the end of each fifty foot length of finished cable formed by the machine, to permit the necessary tag to be attached.

In the preferable construction shown, said means are as follows:—The belt 14 is adapted to be shifted from one of the pulleys 15 and 16 to the other by means of a belt shipper 122, which, as shown, is pivoted at its lower end to an arm 123 on the machine frame, and applied to which is a spring 124 adapted for imparting pivotal movement to said belt shipper 122, to shift the belt from the tight pulley 15 to the loose pulley 16. The belt shipper 122 is adapted to be operated manually to shift the belt to the tight pulley and is adapted to be maintained in such position against the force of the spring 124 applied thereto by means of a rod 125, which is adapted to engage a rigid portion, as shown the rear end, of a rod 126 pivoted to said belt shipper 122.

To start the machine, the shipper 122 is moved pivotally to shift the belt 14 to the tight pulley 15. When the end of the rod 126 passes the lower end of the stop rod 125, said rod 125 is drawn down so that said rod 126 will bear against the lower end thereof, thus securing said shipper 122 in position with the belt 14 running on the tight pulley 15.

To provide for stopping the machine at the end of each fifty-foot length of cable C, means are provided as follows:—Rotatably mounted on the transverse frame member 115 is a wheel 127 formed in the face of which are teeth corresponding to the teeth of a worm wheel, the pitch of said teeth being equal to the pitch on which the outer wire c' is wound. In passing from the head B to the reel 106, the finished cable C runs in contact with the face of the wheel 127, the coils of the outer wire c' engaging the teeth formed on said wheel, substantially in the manner that the teeth of a rack engage the teeth of a gear, whereby the movement of said cable C, as it is wound upon the reel 106, will impart rotary movement to said wheel 127 at a peripheral speed equal to the rate of travel of said cable C.

As shown, the cable C is maintained in engagement with the face of the wheel 127 by means of a grooved idle pulley 128 rotatably mounted on a stud 129 secured in the cross frame member 115.

To provide for inserting the cable C between the wheel 127 and the idler 128, said idler 128 is mounted to rotate on an eccentric 130, which, in turn, is adapted to be secured in different adjusted positions on the stud 129, thus providing for adjusting the idler 128 toward and away from the wheel 127 by turning said eccentric 130 into different positions, and the flanges of said idler 128 are cut away, as shown at 131. Thus, by turning the eccentric 130 to bring said idler 128 to the limit of its movement from the wheel 127, and turning said idler 128 to bring the cut away section 131 of said flange adjacent to said wheel 127, a space will be formed through which the cable C may be inserted bodily between said wheel 127 and idler 128. Said eccentric 130 is then turned to throw said idler 128 toward the wheel 127, the relation being such that the throw of said eccentric will cause the idler to engage the cable C and force the same into engagement with the wheel 127, so as to cause the outer coils of said cable C to engage the teeth of said wheel 127. As shown, the eccentric 130 is adapted to be secured in different adjusted positions by means of a rod 132 threaded through a disk 133 formed at the outer end of said eccentric, which overlaps the outer side of the idler 128, so that the inner end of said rod will frictionally engage the stud 129. As shown, the outer end of said rod 132 is bent at right angles, thus forming a handle for conveniently turning said rod, and also for rotating or throwing the eccentric 130 to effect the desired adjustment of the idler 128 toward and from the wheel 127.

Secured to the outer face of the wheel 127 is a finger 134, which is adapted to engage the teeth of a ratchet wheel 135, rotatably mounted on a stud 136, secured in the transverse frame member 115 at a distance from the wheel 127. Secured to rotate with said ratchet 135 is a disk 137 formed in the perimeter of which is a notch 138, which is adapted to be engaged by a stop pin 139 secured in one arm 140 of a lever pivoted to a stud 141, secured in the frame member 115, the other arm 142 of said lever extending beneath the laterally bent end 143 of the stop rod 125.

Applied beneath the lever arm 142 is a spring 144, which is adapted to impart pivotal movement to said lever to cause the pin 139 carried on the lever arm 140 to engage the notch 138 in the disk 137, the relation being such that pivotal movement of said lever corresponding to engagement of said pin 139 with the notch 138 will cause the lever arm 142 to strike the laterally bent end 143 of the stop rod 125 and to raise said stop rod out of engagement with the rod 126 pivoted to the belt shipper, thus permitting the spring 124 applied to said belt shipper to move said shipper pivotally to shift the belt 14 from the tight pulley 15 to the loose pulley 16, thus stopping the machine.

The disk 137 is preferably made exactly two feet in circumference, and the ratchet 135 is made with twenty-five teeth. With this construction, it is obvious that starting with the ratchet 135 in position corresponding to engagement of the pin 139 with the notch 138, twenty-five revolutions of the wheel 127 will impart one complete revolution to the ratchet wheel 135 and the disk 137 secured to rotate therewith, which, with the wheel 127 exactly two feet in circumference, as assumed, will result in stopping the machine each time fifty feet of the cable C passes the wheel 127.

In Figs. 17 to 19 of the drawings, I have shown a modified form of coiling head, which I will now describe.

Excepting as hereinafter particularly pointed out, said modified form of head, designated as a whole B', is substantially the same in construction as the form of head heretofore described, being provided with a central bore 22' and comprising separate sections 23' and 24'.

The coiling of the wire is effected by means of sets of anti-friction rollers $28^2$, $29^2$ and $30^2$, and $34^2$, $35^2$ and $36^2$, rotatably mounted in recesses 27' and 37' in the adjacent sides of the head sections 23' and 24', respectively, which open laterally into the upper end of the bore 22', the rollers of said sets being of proper sizes and located in proper positions to define circular openings corresponding in size to the desired outside diameters of the finished coils of wire to be formed thereby, respectively. The desired pitch and lead of the wire spirals is defined by means of grooves $b$ formed in said rollers in relative positions corresponding to the lead and pitch of said spirals.

I claim:—

1. In a wire coiling machine, the combination of a rotatable bed, means for rotating said bed, a coiling head secured to rotate with said bed, said coiling head being provided with a bore comprising a spirally grooved section and with recesses which open laterally into said spirally grooved section of said bore, and anti-friction rollers rotatably mounted in said recesses, substantially as described.

2. In a wire coiling machine, the combination of a rotatable bed, means for rotating said bed, a coiling head secured to rotate with said bed, said coiling head being provided with a bore comprising a spirally grooved section and with recesses which open laterally into said spirally grooved section of said bore, and anti-friction rollers rotatably mounted in said recesses, said groove forming approximately a single spiral, substantially as described.

3. In a wire coiling machine, the combination of a rotatable bed, means for rotating said bed, a coiling head secured to rotate with said bed, said coiling head being provided with a bore comprising a spirally grooved section and with recesses which open laterally into said spirally grooved section of said bore, and anti-friction rollers rotatably mounted in said recesses, said rollers comprising a roller which is adjustable toward and from the axis of said bore, substantially as described.

4. In a wire coiling machine, the combination of a rotatable bed, means for rotating said bed, a coiling head secured to rotate with said bed, said coiling head being provided with a bore comprising a spirally grooved section and with recesses which open laterally into said spirally grooved section of said bore, and anti-friction rollers rotatably mounted in said recesses, the last of said rollers being adjustable toward and from the axis of said bore, substantially as described.

5. In a wire coiling machine, the combination of a rotatable bed, means for rotating said bed, a coiling head secured to rotate with said bed, said coiling head being provided with a bore comprising a spirally grooved section and with recesses which open laterally into said spirally grooved section of said bore, and anti-friction rollers rotatably mounted in said recesses, said anti-friction rollers being located at spaced intervals around said spiral groove in positions to define the initial one-half turn of said spiral groove, substantially as described.

6. In a wire coiling machine, the combination of a rotatable bed, means for rotating said bed, a coiling head secured to rotate with said bed, said coiling head being provided with a bore comprising a spirally grooved section and with recesses which open laterally into said spirally grooved section of said bore, and anti-friction rollers rotatably mounted in said recesses, said anti-friction rollers being located at spaced intervals around said spiral groove in positions to define the initial one-half turn of said spiral groove, the final roller of each series being adjustable toward and from the axis of said bore, substantially as described.

7. In a wire coiling machine, the combination of a rotatable bed, means for rotating said bed, a coiling head secured to rotate with said bed, said coiling head comprising separate detachably connected parts and being provided with a bore comprising a spirally grooved section in the face of a part of said coiling head which contacts with the other part thereof, said part being also provided with recesses which open laterally into the spirally grooved section of said bore, and anti-friction rollers rotatably mounted in said recesses, substantially as described.

8. A wire coiling head or die, comprising a body portion provided with a bore comprising a spirally grooved section and with recesses which open laterally into said spirally grooved section of said bore, and anti-friction rollers rotatably mounted in said recesses, said spiral groove forming approximately but a single turn, substantially as described.

9. A wire coiling head comprising a body portion consisting of separate detachably connected parts, said coiling head being provided with a bore comprising a spirally grooved part located in the face of a section of said coiling head which contacts with the other part thereof, and said part being also provided with recesses which open laterally into the spirally grooved section of said bore, and anti-friction rollers rotatably mounted in said recesses, substantially as described.

10. A wire coiling head, comprising a body portion provided with a bore comprising a spirally grooved section and with recesses which open laterally into said spirally grooved section of said bore, and anti-friction rollers rotatably mounted in said recesses, said anti-friction rollers being located at spaced intervals around said spiral groove in positions to define the initial one-half turn of said groove, substantially as described.

11. A wire coiling head, comprising a body portion provided with a bore comprising a spirally grooved section and with recesses which open laterally into said spirally grooved section of said bore, and anti-friction rollers rotatably mounted in said recesses, said anti-friction rollers being located at spaced intervals around said spiral groove in positions to define the initial one-half turn of said groove, the final roller of each series being adjustable toward and from the axis of said bore, substantially as described.

12. In a wire coiling machine, the combination of a rotatable bed, means for rotating said bed, a wire coiling head secured to rotate with said bed, said wire coiling head comprising a body portion provided with a bore comprising a spirally grooved section and with recesses which open laterally into said spirally grooved section of said bore, and idle, anti-friction rollers, rotatably mounted in said recesses, substantially as described.

13. In a wire coiling machine, the combination of a rotatable bed, a coiling head secured to rotate with said bed, said head being provided with a bore comprising a spirally grooved section and with recesses which open into said spirally grooved section of said bore, and anti-friction rollers rotatably mounted in said recesses, comprising a grooved roller located adjacent to the discharge end of said spirally grooved section, substantially as described.

14. In a wire coiling machine, the combination of a rotatable bed, a coiling head secured to rotate with said bed, said head being provided with a bore comprising a spirally grooved section and with recesses which open into said spirally grooved section of said bore, and anti-friction rollers rotatably mounted in said recesses comprising opposed grooved rollers located adjacent to the discharge end of said spirally grooved section, substantially as described.

15. In a wire coiling machine, the combination of a rotatable bed, means for rotating said bed, means for rotatably mounting a coil of wire on said bed, a coiling head secured to rotate with said bed, and feed mechanism for delivering wire from said coil and forcing it into said coiling head, said feed mechanism comprising shafts rotatably mounted, respectively, in a bearing pedestal on said bed, and in a bearing sleeve connected to said bearing pedestal so as to be adjustable toward and from the same, gearing connecting said shafts adapted to drive said shafts in opposite directions, opposed feed rollers secured to rotate with said shafts between which the wire passes, and means rendered operative by rotation of the bed of the machine for rotating said feed shafts, substantially as described.

16. In a wire coiling machine, the combination of a rotatable bed, means for rotating said bed, means for rotatably mounting a coil of wire on said bed, a coiling head secured to rotate with said bed, feed mechanism for delivering wire from said coil and forcing it into said head, said feed mechanism comprising a plurality of shafts mounted in bearings in pedestals on said bed, and shafts opposed thereto, respectively, rotatably mounted in bearing sleeves fulcrumed at their lower ends to the bed of the machine, webs which connect said bearing pedestals and said bearing sleeves, respectively, a bolt which connects said webs for supporting and adjusting said bearing sleeves, said stationary and adjustable shafts being arranged in pairs, gearing which connects said shafts adapted for driving the shafts of each pair in opposite directions and corresponding shafts of different pairs in the same direction, and opposed feed rollers secured to rotate with the shafts of each of said pairs of shafts between which the wire passes, substantially as described.

17. In a wire coiling machine, the combination of a rotatable bed, means for rotating said bed, means for rotatably mounting a coil of wire on said bed, a coiling head secured to rotate with said bed, feed mechanism for delivering wire from said coil and forcing it into said head, said feed mechanism comprising a plurality of shafts mounted in bearings in pedestals on said bed, and shafts opposed thereto, respectively, rotatably mounted in bearing sleeves fulcrumed at their lower ends to the bed of the machine, webs which connect said bearing pedestals and said bearing sleeves, respectively, a bolt which connects said webs for supporting and adjusting said bearing sleeves, said stationary and adjustable shafts being arranged in pairs, gearing which connects said shafts adapted for driving the shafts of each pair in opposite directions and corresponding shafts of different pairs in the same direction, opposed feed rollers secured to rotate with the shafts of each of said pairs of shafts between which the wire passes, and a guide plate which extends between opposed feed shafts, provided with a hole through which the wire extends, said plate being also provided with recesses to receive said feed rollers, the adjacent sides of which intersect each other and also the hole in said plate in which said wire is confined, substantially as described.

18. In a wire coiling machine, the combination of a rotatable bed, wire coiling means carried thereby, a reel on which the finished product delivered from said wire coiling means is adapted to be wound, a shaft to which said reel is secured, and means for rotating said shaft, said means comprising a worm formed in the perimeter of the rotatable bed of the machine, a worm gear rotatably mounted on the machine frame which meshes with the worm formed on said bed, pulleys secured to rotate with said worm gear and with the reel shaft, respectively, and a belt adjusted to said pulleys, substantially as described.

19. In a wire coiling machine of the type described, means for driving said machine and means for automatically stopping said machine at predetermined intervals, said means comprising a gear rotatably mounted in position to contact with the finished product delivered from the machine, said gear being provided with teeth adapted to intermesh with the coils of said finished product, a ratchet wheel rotatably mounted adjacent to said gear, a finger on said gear adapted to engage the teeth of said ratchet wheel and to impart step by step rotation thereto, a disk secured to rotate with said ratchet wheel provided with a peripheral notch, a pivoted lever, a projection thereon adapted to ride on the perimeter of said disk and to engage the notch therein, a spring applied to said lever to move the same pivotally to cause the projection therein to engage the notch in said disk, and a stop rod which controls the means for driving the machine, and operative connection between said pivoted lever and stop rod, the relation being such that when the machine is running, pivotal movement of said lever will impart movement to said stop rod to stop the machine, substantially as described.

20. In a wire coiling machine, the combination of a coiling mechanism, a reel, and means for automatically stopping the machine at predetermined intervals, said means comprising a gear rotatably mounted on the machine frame in a position to contact with the finished product as it leaves the machine, said gear being provided with teeth adapted to intermesh with the coils of said finished product, a ratchet wheel rotatably mounted adjacent to said gear, a finger on said gear adapted to engage the teeth of said ratchet wheel and to impart step by step rotation thereto, a disk secured to rotate with said ratchet wheel provided with a notch in its perimeter, a pivoted lever, a projection thereon adapted to ride on the perimeter of the disk secured to said ratchet wheel and to engage the notch in said disk, a spring applied to said lever adapted to move the same pivotally to cause the projection thereon to engage the notch in said disk, a stop rod, a rigid part of which projects into the path of travel of said lever so as to be raised thereby when the projection on said lever engages the notch of said disk, a belt shipping device, a spring applied thereto adapted to move the same into position corresponding to engagement of the belt with the loose pulley, and a rod applied to said belt shipping device adapted for engagement by the stop rod, heretofore mentioned, to secure said shipping device in position corresponding to engagement of the belt with the fast driving pulley, substantially as described.

21. In combination, wire coiling means constructed and arranged for coiling a plurality of wires to form coils of different diameters arranged one outside of the other, comprising a body portion, separate sets of anti-friction rollers rotatably mounted thereon, within the spaces defined by which, respectively, the different diameters of coils are adapted to be formed, the spaces within said sets of anti-friction rollers being unobstructed, wire feeding means constructed and arranged to feed the wires for forming said coils with a pushing movement, and guiding means for conducting said wires from said feeding means to said wire coiling means constructed and arranged to prevent buckling of the wires between said feeding and coiling means, substantially as described.

22. A head for coiling a plurality of wires to form coils of different diameters arranged one outside of the other, comprising a body portion, and separate sets of anti-friction rollers rotatably mounted thereon, within the spaces defined by which, respectively, the different diameters of coils are adapted to be formed, the spaces within said sets of anti-friction rollers being unobstructed, substantially as described.

23. A head for coiling a plurality of wires to form coils of different diameters one outside of the other, comprising a body portion provided with a coiling chamber comprising sections of different sizes in which, respectively, the small and large coils are formed, openings for feeding wires for forming said coils into the sections of said coiling chamber, and with recesses which open laterally into the different sections of said coiling chamber, and separate sets of anti-friction rollers rotatably mounted in said recesses with which, respectively, wires being coiled in the different sections of said coiling chamber are adapted to contact, substantially as described.

24. A head for coiling a plurality of wires to form coils of different diameters one outside of the other, comprising a body portion provided with a coiling chamber comprising sections of different sizes in which, respectively, the small and large coils are formed, openings for feeding wires for forming said coils into the sections of said coiling chamber, and with recesses which open laterally into the different sections of said coiling chamber, and separate sets of anti-friction rollers rotatably mounted in said recesses with which, respectively, wires being coiled in the different sections of said coiling chamber are adapted to contact, the anti-friction rollers associated with the different sections of said coiling chamber comprising rollers positioned in line with and in such close proximity to the inner ends of the wire admission openings to the sections of said coiling chambers that contact therewith will impart an initial set to the wires entering said coiling chamber sufficient to define substantially the curvature on which said wires are to be coiled, substantially as described.

25. A head for coiling a plurality of wires to form coils of different diameters one outside of the other, comprising a body portion provided with a coiling chamber comprising sections of different sizes in which, respectively, the small and large coils are formed, openings for feeding wires for forming said coils into the sections of said coiling chamber, and with recesses which open laterally into the different sections of said coiling chamber, and separate sets of anti-friction rollers rotatably mounted in said recesses with which, respectively, wires being coiled in the different sections of said coiling chamber are adapted to contact, the inner section of said coiling chamber being provided with a spiral groove adapted to define the pitch of the inner coil, substantially as described.

26. A head for coiling a plurality of wires to form coils of different diameters one outside of the other, comprising a body portion provided with a longitudinal bore comprising a coiling chamber, said coiling chamber comprising sections of different sizes in which, respectively, the small and large coils are formed, said coiling head also being provided with openings for feeding wires for forming said coils into the different sections of said coiling chamber, and with recesses which open laterally into different sections of said coiling chamber, and separate sets of anti-friction rollers rotatably mounted in said recesses with which, respectively, wires being coiled in the different sections of said coiling chamber are adapted to contact, substantially as described.

27. A head for coiling a plurality of wires to form coils of different diameters one outside of the other, comprising a body portion divided transversely, and means for detachably connecting the parts thereof, said body portion being provided with a coiling chamber comprising separate sections formed in the contacting surfaces of the parts of said body portion, one adapted for forming the smaller coil and the other for forming the larger coil, and with openings for feeding wires for forming said coils into the different sections of said coiling chamber, said body portion also being provided with series of recesses formed in the contacting sides of both parts thereof, the series of recesses formed in each part of said body portion opening laterally into the section of said coiling chamber formed in the same part thereof, and separate sets of anti-friction rollers rotatably mounted in said series of recesses with which, respectively, wires being coiled in the different sections of said coiling chamber are adapted to contact, substantially as described.

28. A head for coiling a plurality of wires to form coils of different diameters one outside of the other, comprising a body portion provided with a coiling chamber comprising sections of different sizes in which, respectively, the small and large coils are formed, openings for feeding wires for forming said coils into the sections of said coiling chamber, and with recesses which open laterally into the different sections of said coiling chamber, studs secured in the body portion of said coiling head or die which project into said recesses, and separate sets of anti-friction rollers rotatably mounted on said studs within said recesses with which, respectively, wires being coiled in the different sections of said coiling chamber are adapted to contact, substantially as described.

29. A head for coiling a plurality of wires to form coils of different diameters one outside of the other, comprising a body portion divided transversely, and means for detachably connecting the parts thereof, said body portion being provided with a coiling chamber comprising separate sections formed in the contacting surfaces of the parts of said body portion, one adapted for forming the smaller coil and the other for forming the larger coil, and with openings for feeding wires for forming said coils into the different sections of said coiling chamber, said body portion also being provided with series of recesses formed in the contacting sides of both parts thereof, the series of recesses formed in each part of said body portion opening laterally into the section of said coiling chamber formed in the same part thereof, studs secured in the body portion of said head or die which project into said recesses, and separate sets of anti-friction rollers rotatably mounted on said studs within said recesses with which, respectively, wires being coiled in the different sections of said coiling chamber are adapted to contact, substantially as described.

In testimony that I claim the foregoing as my invention, I affix my signature in presence of two subscribing witnesses, this 5th day of April, 1912.

SAMUEL P. SMURR.

Witnesses:
M. H. BIXEL,
E. M. KLATCHER.